Patented May 23, 1933

1,910,676

UNITED STATES PATENT OFFICE

BRUNO BRUHN, OF NEW YORK, N. Y.

PROCESS OF MAKING CEMENT FROM FLUID SLAG

No Drawing.  Application filed October 4, 1929. Serial No. 397,456.

Many methods have been developed for making cement from blast furnace and other slag. The majority of the processes which are commercially applied, consist of adding lime or lime-containing material to the slag either in a hot or cold condition thereby increasing the so-called hydraulic modulus or the ratio $$\frac{CaO}{SiO_2+Al_2O_3+Fe_2O_3}.$$

The best known process is to cool and grind the slag with the necessary quantity of limestone and to produce a normal Portland cement by re-burning and re-grinding the mixture. In some cases a further admixture of slag to the clinker is used without detriment to the final product, which in this case consists of ground Portland cement and ground slag.

Attempts have been made to incorporate the necessary lime to the slag while still fluid, but these attempts have failed to give good results.

Any considerable addition of lime (CaO) to fluid slag will cause the melting point of the mixture to rise so that even if it is kept at blast furnace temperature or higher temperatures obtainable by ordinary fuel, like gas, oil, pulverized coal, etc. (except in an electric furnace, the operation of which will, in most cases, be far too expensive for this purpose), the mixture will quickly solidify and not permit the lime to be incorporated or the forming of a homogeneous, fused or sintered product of commercial value.

Normal blast furnace slag contains a comparatively high proportion of silica ($SiO_2$), much less alumina ($Al_2O_3$), and as a rule very little, if any, ferric oxide ($Fe_2O_3$). In order to form strong hydraulic products; namely, tricalcium silicate, dicalcium aluminate, or bicalcium ferrate, silica ($SiO_2$) requires, according to the formula $3CaO \cdot SiO_2$, nearly 2½ times as much lime (CaO) as the same weight of alumina ($Al_2O_3$) according to the formula $2CaO \cdot Al_2O_3$ would require, and 4 times as much lime (CaO) as the same weight of ferric oxide ($Fe_2O_3$) according to the formula $2CaO \cdot Fe_2O_3$ would require. In other words—and this is an essential fact underlying the present invention—the higher the content of silica is in respect to the two other components the more lime is necessary to saturate a slag or a mixture of silica, alumina and iron oxides with lime and to convert it into a highly hydraulic product.

My invention consists in not only increasing the hydraulic modulus by adding lime, as has been done before, but also decreasing the silica modulus or the ratio $$\frac{SiO_2}{Al_2O_3+Fe_2O_3}$$

by adding alumina or iron or both besides the necessary lime. By doing this the quantity of lime necessary for producing a highly hydraulic product is lessened and therefore the melting point of the mixture lowered. I have found that the temperature of the blast furnace and of any of the wellknown rotary or open hearth or reverberatory furnaces heated with carboniferous fuel is sufficient to fuse the mix of slag with alumina, iron oxide and lime and that the product after cooling and grinding is of commercial value, provided the following proportions are upheld:

$$\frac{CaO}{SiO_2+Al_2O_3+Fe_2O_3}=2.25-1.4$$

$$\frac{SiO_2}{Al_2O_3+Fe_2O_3}=1.5-0.5$$

Manganese and other metals of the iron group may replace the iron.

As may be seen from these proportions my process differs entirely from old processes aiming at the analysis of normal Portland cement in which besides lime only very small quantities of sesquioxides were added as a flux.

In some cases where it will not disturb the production of pig iron, the process can be performed partly in the blast furnace itself. All that is necessary is to produce a slag richer in lime and iron or alumina and less rich in silica than usual and in approximately the proportions shown below. As a rule, however, it will be necessary to separate the primary process of making pig iron from the secondary process of making cement and to use a separate furnace or kiln for making a cement, preferably in the vicinity of the blast furnace so that the incandescent slag may be transferred from one furnace to the other with the least possible loss of heat.

It is important to ultimately have the iron in the cement mixture as $Fe_2O_3$ not as $Fe_3O_4$ or $FeO$ in order to form the ferrate of lime which has the hydraulic qualities. For this reason a slightly oxidizing atmosphere should be maintained in the cement kiln. In case the proper general composition is already created in the blast furnace, in which naturally a reducing condition has been maintained, the oxidation of the product has to take place outside the blast furnace by blowing air through or over the fluid slag which may be done in a separate furnace or kiln or ladle or converter. In order to secure a complete and homogeneous mixture of the slag and the additions it is advisable to stir the molten fluid. This may be done mechanically or by a current of air, if necessary preheated air. Instead of air the carbonic acid contained in the carbonate of lime and evaporating under the heat and the reaction of the flux, may be used as a stirring agent.

As an example of a good commercial cement which can easily be obtained from many blast furnace slags or similar mixtures of natural raw material or industrial by-products and without limiting my invention to these figures I may mention the following analysis as very suitable for the purpose:

| | |
|---|---|
| Silica   $SiO_2$ | 12 to 18% |
| Alumina  $Al_2O_3$ | 5 to 15% |
| Ferric oxide  $Fe_2O_3$ | 7 to 15% |
| Lime  $CaO$ | 57 to 63% |

I have referred to the use of lime (CaO) but by this term as here used I mean to include and do include any calcium compound which by heat treatment in the process will be converted in the oxide of calcium, as for instance, calcium carbonate $CaCO_3$ or calcium hydrate $Ca(OH)_2$. The same applies where I have used ferric oxide $Fe_2O_3$ or alumina $Al_2O_3$, as the carbonate or hydrate might be used in either or both cases as these will give off carbon dioxide, or water and be converted into the oxide.

In carrying out my process the slag may be in a uniformly molten state, but in some cases the slag may have more or less solidified at the time the other ingredients are added or it may solidify upon the addition of the other ingredients. In that case it is necessary to apply heat to restore the slag to its molten condition and permit of the thorough dispersion and mixing of the added materials.

Having thus described my invention, what I claim as new and desire to secure by Letters Patent is:

1. The process of making cement which includes mixing lime and oxides of metals of the iron group into molten slag and in such proportions as will give a silica ($SiO_2$) content of 12% to 18%, an alumina ($Al_2O_3$) content of 5% to 15%, a ferric oxide ($Fe_2O_3$) content of 7% to 15%, and a lime (CaO) content of 57% to 63%, maintaining the temperature of the mixture molten while mixing to form a homogeneous mass, cooling to solid form, and grinding.

2. The process of making a cement, which includes mixing lime and oxides of iron and alumina in molten slag and in such proportions as to give a hydraulic modulus between 1.34 and 1.7 and a silica modulus having a range of .387 to .947, maintaining the mass fluid during the mixing until the product is homogeneous, cooling to solidify the mass, and grinding.

3. The process of making cement, which includes mixing lime and oxides of the iron group in molten slag and in such proportion that the silica modulus is not greater than 1.5 or smaller than 0.5, maintaining the mass fluid during thorough mixing, cooling the mass to solid form, and grinding the product.

4. The process of making cement, which includes mixing lime and oxides of the iron group in molten slag and in such proportion that the silica modulus is not greater than .947 and not smaller than .387, maintaining the mass fluid during thorough mixing, cooling the mass to solid form, and grinding the product.

Signed at New York in the county of New York and State of New York this 3rd day of October A. D. 1929.

BRUNO BRUHN.